United States Patent
Shioiri et al.

(10) Patent No.: US 11,110,703 B2
(45) Date of Patent: Sep. 7, 2021

(54) PRINTING APPARATUS AND CONTROL METHOD

(71) Applicant: CANON KABUSHIKI KAISHA, Tokyo (JP)

(72) Inventors: Hiroyuki Shioiri, Yokohama (JP); Kazuhiro Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/292,887

(22) Filed: Mar. 5, 2019

(65) Prior Publication Data
US 2019/0283405 A1 Sep. 19, 2019

(30) Foreign Application Priority Data
Mar. 13, 2018 (JP) .............................. JP2018-045929

(51) Int. Cl.
*B41J 2/045* (2006.01)
*B41J 2/21* (2006.01)
*B41J 2/165* (2006.01)
*B41J 11/00* (2006.01)

(52) U.S. Cl.
CPC ........... *B41J 2/04551* (2013.01); *B41J 2/045* (2013.01); *B41J 2/04586* (2013.01); *B41J 2/16588* (2013.01); *B41J 2/2146* (2013.01); *B41J 11/0025* (2013.01)

(58) Field of Classification Search
CPC ............... B41J 2/04551; B41J 2/16588; B41J 11/0025; B41J 2/2146; B41J 2/04586; G06K 15/1823; G06K 15/1817; G06K 15/18
See application file for complete search history.

(56) References Cited

U.S. PATENT DOCUMENTS

| 9,533,492 | B2 | 1/2017 | Murasawa et al. |
| 9,815,274 | B2 | 11/2017 | Murasawa et al. |
| 2014/0211226 | A1* | 7/2014 | Ishii .................. G06K 15/4065 358/1.12 |
| 2016/0297191 | A1* | 10/2016 | Murasawa ........... B41J 2/04536 |
| 2017/0066233 | A1 | 3/2017 | Murasawa et al. |

FOREIGN PATENT DOCUMENTS

JP 2016198967 A 12/2016

OTHER PUBLICATIONS

IP.com search1 (Year: 2020).*
IP.com search2 (Year: 2020).*
IP.com search (Year: 2021).*

* cited by examiner

*Primary Examiner* — Lisa Solomon
(74) *Attorney, Agent, or Firm* — Venable LLP (57) ABSTRACT

Each of a first image processing unit and a second image processing unit is configured to generate print data to be used by a printing unit based on image data generated by a controller. The controller comprises a transmission control unit configured to select, based on a sheet size which is a print setting corresponding to a print job as a condition, one of first transmission control of controlling a transmission unit to alternately transmit band data included in first image data and band data included in second image data and second transmission control of controlling the transmission unit so that the band data included in the second image data will be transmitted after the band data included in the first image data has been transmitted.

12 Claims, 10 Drawing Sheets

PRINTING APPARATUS AND CONTROL METHOD

BACKGROUND OF THE INVENTION

Field of the Invention

The present invention relates to a printing apparatus for printing based on image data and a control method.

Description of the Related Art

A printing apparatus performs an operation to increase the processing speed until image data is converted into print data which is to be used for printing by the printhead, and parallel processing is known as a technique for performing such an operation. Japanese Patent Laid-Open No. 2016-198967 discloses a technique in which image data is divided into predetermined areas and sets of image data of the predetermined areas are distributed among two ASICs for image processing. Furthermore, it is disclosed in Japanese Patent Laid-Open No. 2016-198967 that the predetermined area is set for the image data in correspondence with a nozzle controlled by each ASIC for image processing.

In a case in which image data is to be transmitted to each of a plurality of external image processing units on a band basis, the processing load will increase for a controller, formed by ASIC or the like and on the image data transmission side, depending on conditions such as the capacity of a buffer memory and the performance of a decoder. Hence, there is a need to appropriately control the transmission of image data to a plurality of image processing units. Japanese Patent Laid-Open No. 2016-198967, however, does not disclose how segmented image data can be transmitted to two ASICs for image processing.

SUMMARY OF THE INVENTION

An aspect of the present invention is to eliminate the above-mentioned problems with the conventional technology. The present invention provides a printing apparatus that appropriately controls transmission of image data to a plurality of image processing units and a control method.

The present invention in one aspect provides a printing apparatus comprising: a controller configured to generate image data based on a print job; and a first image processing unit and a second image processing unit each of which is configured to generate print data to be used by a printing unit based on the image data generated by the controller, wherein the controller comprises a transmission unit configured to transmit, from the image data, first image data which is to be a processing target area of the first image processing unit to the first image processing unit, and to transmit second image data which is to be a processing target area of the second image processing unit to the second image processing unit, and a transmission control unit configured to select, based on a sheet size which is a print setting corresponding to the print job as a condition, one of first transmission control of controlling the transmission unit to alternately transmit band data included in the first image data and band data included in the second image data and second transmission control of controlling the transmission unit so that the band data included in the second image data will be transmitted after the band data included in the first image data has been transmitted.

According to the present invention, transmission of image data to a plurality of image processing units can be appropriately controlled.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components, and a description thereof will be omitted.

Figure 1:
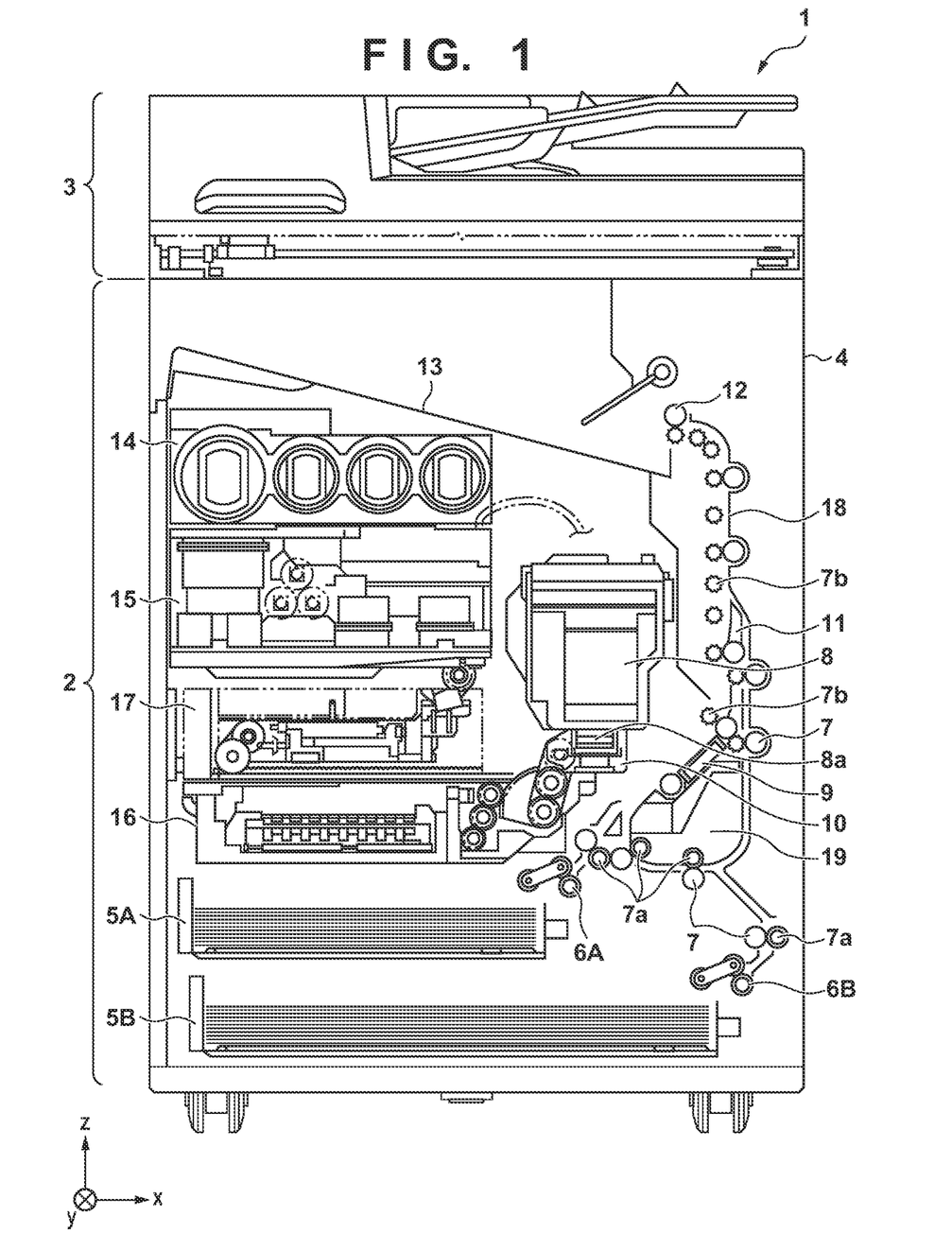
FIG. 1 is a view showing the arrangement of a printing apparatus in a standby state.

FIG. 1 is a view showing the internal arrangement of an inkjet printing apparatus 1 (to be referred to as a printing apparatus 1 hereinafter) used in this embodiment. In FIG. 1, the X direction, the Y direction (direction perpendicular to a sheet surface), and the Z direction indicate a horizontal direction, a direction in which orifices are arrayed in a printhead 8 (to be described later), and a vertical direction, respectively.

The printing apparatus 1 is a multi-function peripheral that includes a printing unit 2 and a scanner unit 3, and can execute various kinds of processing related to a printing operation and a reading operation in the printing unit 2 and the scanner unit 3 individually or cooperatively. The scanner unit 3 includes an ADF (automatic document feeder) and an FBS (flatbed scanner), can read an original which is automatically fed by the ADF, and can read (scan) an original placed on a document table of the FBS by a user. Note that although the printing apparatus 1 is a multi-function peripheral having the printing unit 2 and the scanner unit 3 in this embodiment, it may not include the scanner unit 3. FIG. 1 shows a standby state in which neither the printing operation nor the reading operation is executed by the printing apparatus 1.

In the printing unit 2, a first cassette 5A and a second cassette 5B for containing print media (cut sheets) S are installed in a detachable manner in a bottom portion of a housing 4 in a vertically downward direction. Comparatively small print media of sizes up to A4 size are stacked and contained in the first cassette 5A, and comparatively large print media of sizes up to A3 size are stacked and contained in the second cassette 5B. A first feeding unit 6A configured to separate and feed the contained print media sheet by sheet is provided near the first cassette 5A. In the same manner, a second feeding unit 6B is provided near the second cassette 5B. Each print medium S is selected and fed from one of the cassettes when a printing operation is to be performed.

Conveyance rollers 7, a discharge roller 12, pinch rollers 7a, spurs 7b, a guide 18, an inner guide 19, and a flapper 11 are conveyance mechanisms for guiding the print medium S in a predetermined direction. The conveyance rollers 7 are arranged on the upstream side of the printhead 8 and are driving rollers driven by a conveyance motor (not shown). The pinch rollers 7a are driven rollers that nip and rotate the print medium S together with the conveyance rollers 7. The discharge roller 12 is arranged on the downstream side of the printhead 8 and is a driving roller driven by a conveyance motor (not shown). The spurs 7b supportively hold and convey the print medium S together with the discharge roller 12.

The guide 18 is arranged in the conveyance path of the print medium S and guides the print medium S in a predetermined direction. The inner guide 19 is a member extending in the Y direction, has a curved side surface, and guides the print medium S along the side surface. The flapper 11 is a member for switching the conveyance direction of the print medium S when a double-sided printing operation is to be performed. A discharge tray 13 is a tray for stacking and holding each print medium S that has undergone the printing operation and has been discharged by the discharge roller 12.

The printhead 8 according to this embodiment is a full-line-type color inkjet printhead. In in a full-line-type printhead, a plurality of orifices for discharging ink in accordance with print data in number corresponding to a length at least equal to or more than the width of the print medium S are arranged along the Y direction in FIG. 1. When the printhead 8 is in a standby position, an orifice surface 8a of the printhead 8 is capped by a cap unit 10 as shown in FIG. 1. When a printing operation is to be performed, a print controller 202 (to be described later) will change the direction of the printhead 8 so the orifice surface 8a will face a platen 9. The platen 9 is formed by a flat board extending in the Y direction, and supports the print medium S, which is to undergo a printing operation by the printhead 8, from the back surface of the print medium. The movement of the printhead 8 from the standby position to a printing position will be described later.

Ink tank units 14 individually store four color inks to be supplied to the printhead 8. An ink supply unit 15 is arranged in the middle of a channel connecting the ink tank units 14 and the printhead 8 and adjusts the pressure and the flow rate of ink in the printhead 8 so the pressure and the flow rate will fall within appropriate ranges. This embodiment adopts a circulation-type ink supply system, and the ink supply unit 15 adjusts the pressure of the ink supplied to the printhead 8 and the flow rate of the ink collected from the printhead 8 so they will fall within predetermined ranges.

A maintenance unit 16 includes the cap unit 10 and a wiping unit 17 and performs a maintenance operation on the printhead 8 by causing these units to operate at a predetermined timing. The maintenance operation will be described in detail later.

Figure 2:
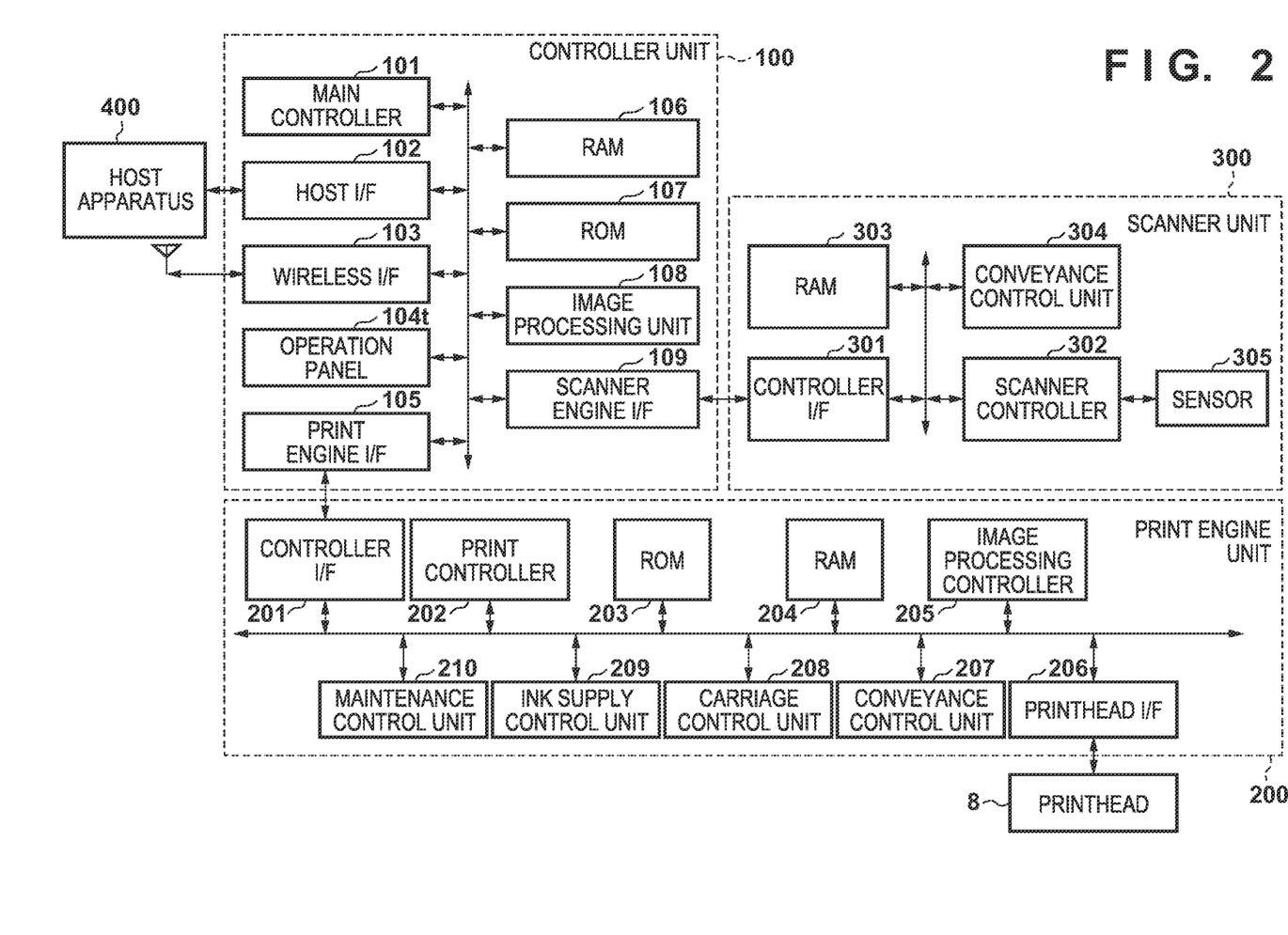
FIG. 2 is a block diagram showing the control arrangement of the printing apparatus.

FIG. 2 is a block diagram showing the control arrangement of the printing apparatus 1. The control arrangement is mainly formed by a print engine unit 200 configured to generally control the printing unit 2, a scanner engine unit 300 configured to generally control the scanner unit 3, and a controller unit 100 configured to generally control the overall printing apparatus 1. The print controller 202 controls the various kinds of mechanisms of the print engine unit 200 under the instruction of a main controller 101 of the controller unit 100. The various kinds of mechanisms of the scanner engine unit 300 are controlled by the main controller 101 of the controller unit 100. The control arrangement will be described in detail hereinafter.

In the controller unit 100, the main controller 101 formed by a CPU controls the overall printing apparatus 1 in accordance with programs and various kinds of parameters stored in a ROM 107 while using a RAM 106 as a work area. For example, when a print job is input from a host apparatus 400 via a host I/F 102 or a wireless I/F 103, predetermined image processing is performed on the image data received by an image processing unit 108 under the instruction of the main controller 101. The main controller 101 then transmits the image data that has undergone the image processing operation to the print engine unit 200 via a print engine I/F 105.

Note that the printing apparatus 1 may obtain the image data from the host apparatus 400 via wireless communication or wired communication or may obtain image data from an external storage device (USB memory or the like) connected to the printing apparatus 1. The communication method used in the wireless communication or the wired communication is not limited. For example, as a communication method to be used for wireless communication, Wi-Fi® (Wireless Fidelity) or Bluetooth® can be applied. Also as a communication method for wired communication, USB (Universal Serial Bus) or the like can be applied. In addition, for example, when a read command is input from the host apparatus 400, the main controller 101 transmits this command to the scanner unit 3 via a scanner engine I/F 109.

An operation panel 104 is a mechanism for the user to make an input to/output from the printing apparatus 1. The user can instruct an operation such as copying, scanning, and the like, set a print mode, and recognize the information of the printing apparatus 1 via the operation panel 104.

In the print engine unit 200, the print controller 202 formed by a CPU controls the various kinds of mechanisms included in the printing unit 2 in accordance with the programs and various kinds of parameters stored in a ROM 203 while using a RAM 204 as a work area. When various kinds of commands and image data are received via a controller I/F 201, the print controller 202 temporarily stores these pieces of information in the RAM 204. The print controller 202 causes each image processing controller 205 to convert the stored image data into print data so that the image data can be used in the printing operation by the printhead 8. When the print data is generated, the print controller 202 causes the printhead 8 to execute a printing operation based on the print data via a printhead I/F 206. At this time, the print controller 202 conveys the print medium S by driving the feeding units 6A and 6B, the conveyance rollers 7, the discharge roller 12, and the flapper 11 via a conveyance control unit 207 shown in FIG. 1. Print processing is performed by executing the printing operation by the printhead 8 cooperatively with the conveyance operation of the print medium S under the instruction of the print controller 202.

A carriage control unit 208 changes the direction and the position of the printhead 8 in accordance with the operation state such as the maintenance state and the printing state of the printing apparatus 1. An ink supply control unit 209 controls the ink supply unit 15 so that the pressure of ink supplied to the printhead 8 will fall within an appropriate range. A maintenance control unit 210 controls the operation of the cap unit 10 and the wiping unit 17 in the maintenance unit 16 when a maintenance operation is to be performed on the printhead 8.

In the scanner engine unit 300, the main controller 101 controls the hardware resource of a scanner controller 302 in accordance with programs and various kinds of parameters stored in the ROM 107 while using the RAM 106 as a work area. As a result, the various kinds of mechanisms included in the scanner unit 3 are controlled. For example, when the main controller 101 controls the hardware resource in the scanner controller 302 via a controller I/F 301, an original that has been loaded onto the ADF by the user is conveyed via a conveyance control unit 304 and read by a sensor 305. Subsequently, the scanner controller 302 stores the read image data in a RAM 303. Note that by converting the image data obtained in the above-described manner into the print data, the print controller 202 can cause the printhead 8 to execute a printing operation based on the image data read by the scanner controller 302.

Figure 3:
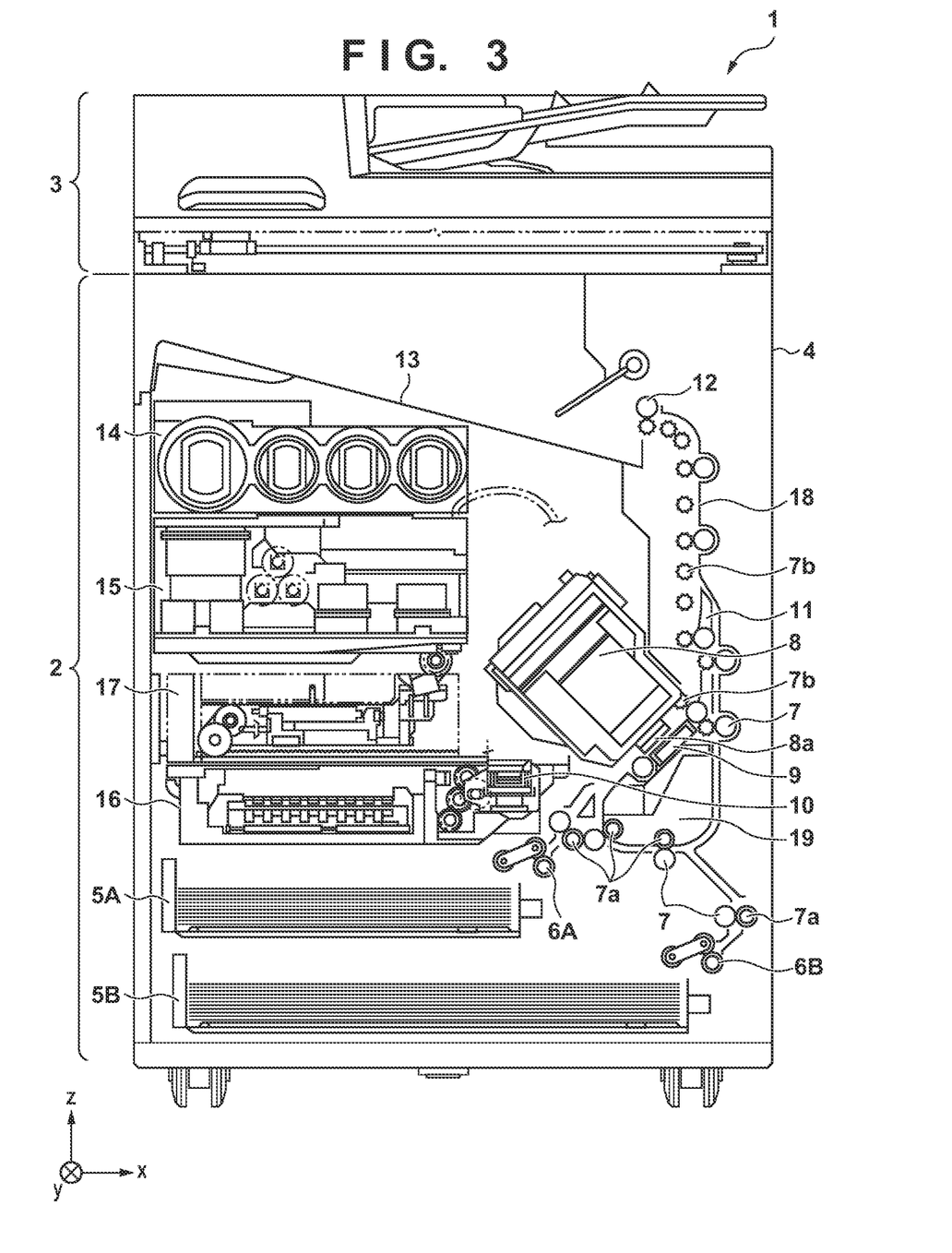
FIG. 3 is a view showing the arrangement of the printing apparatus in a print state.

FIG. 3 shows the printing apparatus 1 in the print state. Compared to the standby state shown in FIG. 1, the cap unit 10 is spaced apart from the orifice surface 8a of the printhead 8, and the orifice surface 8a is facing the platen 9. In this embodiment, the plane of the platen 9 has a tilt of 45° with respect to the horizontal direction, and the orifice surface 8a of the printhead 8 at the printing position also has a tilt of 45° with respect to the horizontal direction so that its distance to the platen 9 will be kept constant.

When the printhead 8 is to be moved from the standby position shown in FIG. 1 to the printing position shown in FIG. 3, the print controller 202 uses the maintenance control unit 210 to lower the cap unit 10 to a retreat position shown in FIG. 3. As a result, the orifice surface 8a of the printhead 8 is spaced apart from the from a cap member (not shown). Subsequently, the print controller 202 uses the carriage control unit 208 to rotate the printhead by 45° while adjusting the height of the printhead 8 in the vertical direction, causing the orifice surface 8a to face the platen 9. When the printing operation has been completed and the printhead 8 is to move from the printing position to the standby position, the print controller 202 will perform the above-described operation in reverse.

The conveyance path of the print medium S in the printing unit 2 will be described next. When a print command is input, the print controller 202 will first use the maintenance control unit 210 and the carriage control unit 208 to move the printhead 8 to the printing position shown in FIG. 3. Subsequently, the print controller 202 will use the conveyance control unit 207 to supply the print medium S by driving one of the first feeding unit 6A and the second feeding unit 6B in accordance with the print command.

In this embodiment, the print engine unit 200 includes a plurality of image processing controllers 205. Image data generated in the controller unit 100 is divided, and parallel image processing is performed in the plurality of image processing controllers 205. In addition, during that time, image data transfer is performed by switching the image data transfer method to each of the image processing controllers 205 in accordance with the sheet size and the print resolution.

<Arrangement of Printing Apparatus>

Figure 4:
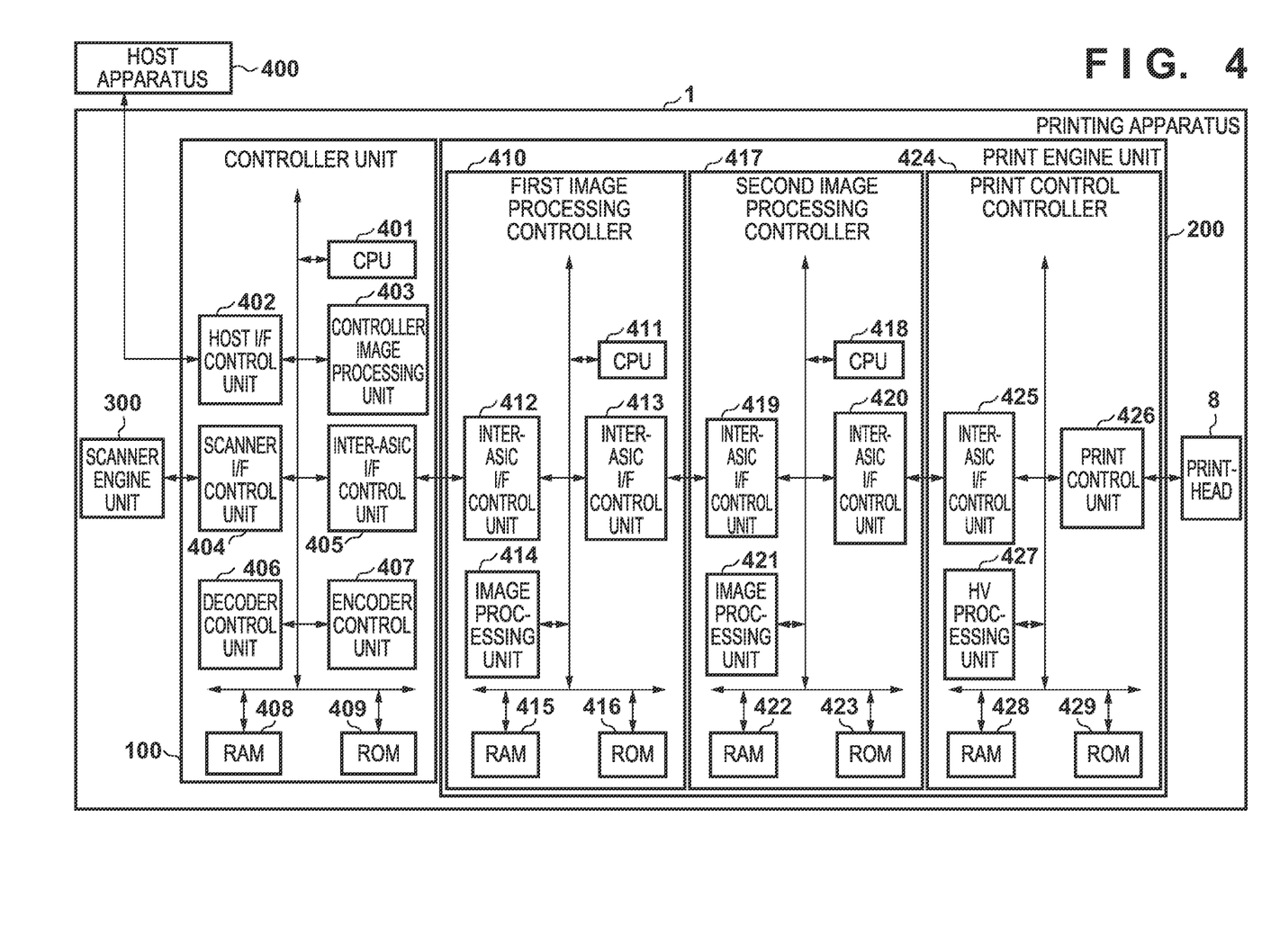
FIG. 4 is a block diagram showing the arrangement of a controller unit and a print engine unit.

FIG. 4 is a block diagram showing the control arrangement of the printing apparatus 1 according to this embodiment. As shown in FIG. 4, the printing apparatus 1 includes the controller unit 100 and the print engine unit 200 including a first image processing controller 410, a second image processing controller 417, and a print control controller 424 (printing unit). The first image processing controller 410 and the second image processing controller 417 correspond to the image processing controllers 205 shown in FIG. 2. In this manner, the printing apparatus 1 according to this embodiment will be described as including four controllers as an example of its arrangement. Among these, the controller unit 100 functions as a main controller unit that generates image data which is to undergo image processing in the first image processing controller 410 and the second image processing controller 417. In addition, the first image processing controller 410 and the second image processing controller 417 function as sub-controllers for the controller unit 100.

The controller unit 100 executes, based on the input print job, processing to generate image data processable by the first image processing controller 410 and the second image processing controller 417. For example, a controller image processing unit 403 of the controller unit 100 generates image data corresponding to a page included in page description language (to be referred to as PDL hereinafter) data based on the PDL transmitted from the host apparatus 400 via a host I/F control unit 402. Also, for example, the controller image processing unit 403 will generate image data corresponding to the number of scanned sheets based on scan data transmitted from the scanner engine unit 300 via a scanner I/F control unit 404. An encoder control unit 407 of the controller unit 100 controls an encoder to encode the image data generated in the controller image processing unit 403. As a result, compressed data is generated and temporarily stored in a RAM 408. Compressed data temporarily stored in the RAM 408 is regenerated into image data by a decoder control unit 406 which controls a decoder to decode the compressed data, and the decoded data is stored in the RAM 408. Note that in this embodiment, the decoder controlled by the decoder control unit 406 is a decoder that cannot execute partial decoding. An explanation of partial decoding will be given later. Furthermore, the image data is divided so that image data belonging to a processing target area of the first image processing controller 410 will be transmitted to the first image processing controller 410 and image data belonging to a processing target area of the second image processing controller 417 will be transmitted to the second image processing controller 417. An area in the RAM 408 where the transmission target image data is stored will be called a transmission buffer area hereinafter.

The image data stored in the transmission buffer area is transmitted to the first image processing controller 410 via an inter-ASIC I/F control unit 405 and stored in a RAM 415 of the first image processing controller 410. An area in each of the RAM 415 and a RAM 422 where the received image data is stored will be referred to as a reception buffer area hereinafter. Note that in this embodiment, the inter-ASIC I/F is a PCI Express (PCIe) interface, and each inter-ASIC I/F control unit will perform protocol processing and DMA control in the PCIe interface.

A CPU 411 of the first image processing controller 410 determines whether the image data stored in the reception buffer area of the RAM 415 is image data that should undergo print data generation processing for generating print data in the first image processing controller 410. As a result, if it is determined that the image data is image data that should undergo the print data generation processing in first image processing controller 410, the CPU 411 will instruct an image processing unit 414 to generate print data based on the image data stored in the reception buffer area of the RAM 415. On the other hand, if it is determined that the image data is not image data that should undergo the print data generation processing in first image processing controller 410, the CPU will transmit the image data stored in the reception buffer area of the RAM 415 to the second image processing controller 417 via an inter-ASIC I/F control unit 413. This image data is stored in the reception buffer area of the RAM 422 of the second image processing controller 417.

The print data generated by the image processing unit 414 based on the image data stored in the reception buffer area of the RAM 415 is stored in the RAM 415. Assume that an area in each of the RAM 415 and the RAM 422 where the print data is stored will be referred to as a print buffer area hereinafter. The print data stored in the print buffer area of the RAM 415 is transmitted to the second image processing controller 417 via the inter-ASIC I/F control unit 413 and stored in the print buffer area of the RAM 422.

An image processing unit 421 of the second image processing controller 417 generates print data based on the image data stored in the reception buffer area of the RAM 422. The print data generated in the image processing unit 421 is stored in the print buffer area of the RAM 422. As described above, since print data that has been generated by the first image processing controller 410 is also stored in the print buffer area of the RAM 422, print data corresponding to data of one page will be ultimately generated in the print buffer area.

Each of the first image processing controller 410 and the second image processing controller 417 has an image processing unit, and the processing target area of image data that is to undergo the print data generation processing differs for each image processing unit. Hence, these image processing units can independently operate in parallel to each other.

When print data corresponding to data of one page has been generated in the print buffer area of the RAM 422, a CPU 418 notifies the print control controller 424 of the start of the printing operation based on the print data corresponding to data of one page. After the notification, the CPU 418 transmits the print data stored in the print buffer area of the RAM 422 to the print control controller 424 via an inter-ASIC I/F control unit 420. The print data transmitted to the print control controller 424 is stored in the RAM 428.

After receiving the printing start notification from the second image processing controller 417, the print control controller 424 receives the print data and stores the received print data in a RAM 428. Subsequently, an HV conversion processing unit 427 executes HV conversion processing on the print data stored in the RAM 428. The print data sorted by the HV conversion processing is stored again in the RAM 428. A print control unit 426 controls the printing operation of forming an image on a print medium such as a sheet by transmitting the print data, which has been stored in the RAM 428 after undergoing the HV conversion processing, to the printhead 8.

<Series of Processes Executed by Controller Unit from Input of Print Job to Storage of Compressed Data>

Figure 5:
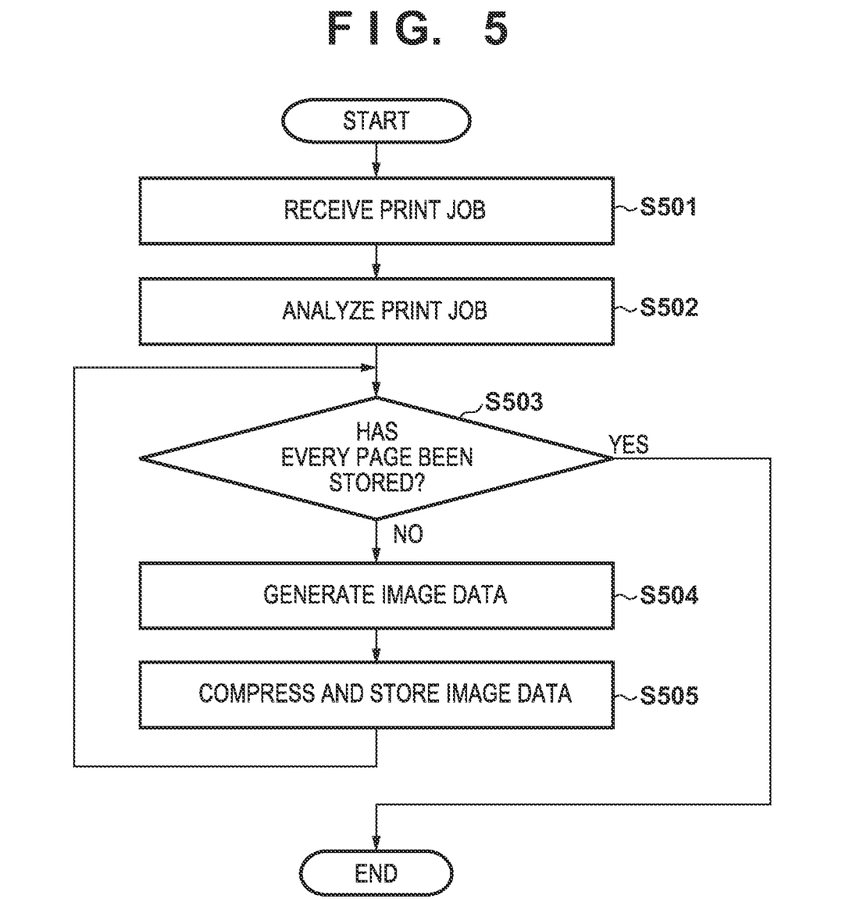
FIG. 5 is a flowchart showing processing performed from print job reception to image data storage.

FIG. 5 is a flowchart showing processing executed in the controller unit 100 from print job input to compressed data storage. In step S501, the host I/F control unit 402 receives PDL data from the host apparatus 400. Alternatively, the scanner I/F control unit 404 receives scan data from the scanner engine unit 300. In step S502, CPU 401 analyzes the received print job. Various kinds of settings to be used in the printing are obtained in this analysis. For example, print settings such as the number of pages, the number of copies, the sheet size, the print resolution, and color or monochrome setting are obtained.

In step S503, the CPU 401 determines whether data corresponding to all of the pages obtained in step S502 is already stored in a spool buffer. If storage of the data corresponding to all of the pages has not been completed (NO in step S503), the encoder control unit 407 generates, in step S504, image data from the print job based on the print settings obtained in step S502. Note that image data of a size (pixel count) corresponding to the sheet size and print resolution included in the print settings will be generated in step S504. That is, the size of the image data to be generated in step S504 will increase since the pixel count necessary for the printing operation will increase the higher the print resolution is or the larger the sheet size is. In step S505, the encoder control unit 407 encodes the image data generated in step S504 and stores the encoded image data in the spool buffer. In step S503, if it is determined that the data corresponding to all of the pages which has been obtained is already stored in the spool buffer (YES in step S503), the processing of FIG. 5 ends.

<Image Data Transmission Processing Executed by Controller Unit>

Figure 7A:
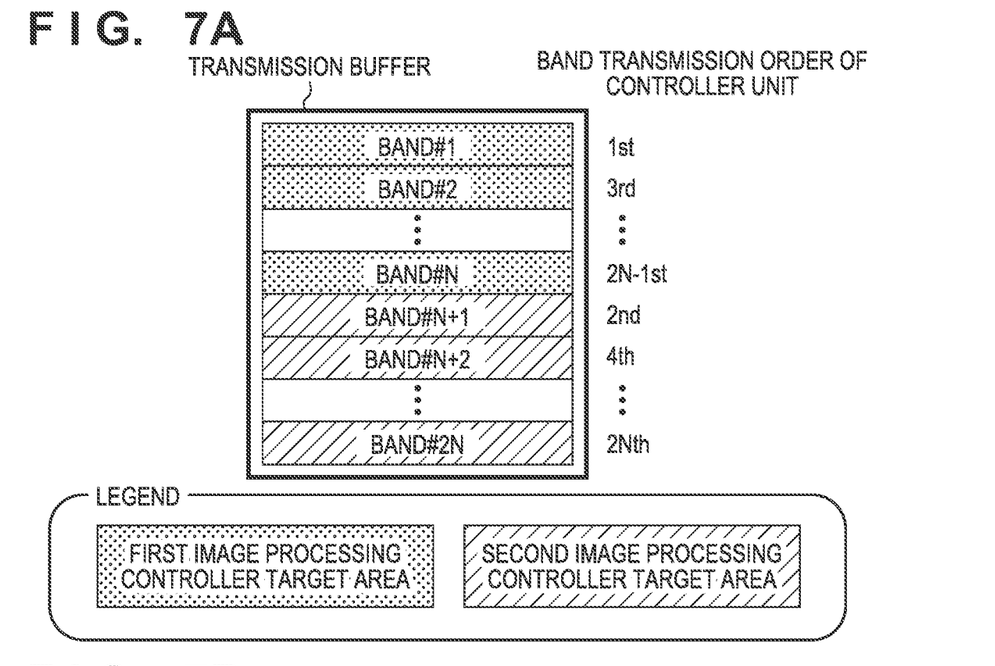
FIGS. 7A and 7B are views for explaining alternate transfer and sequential transfer, respectively.
Figure 7B:
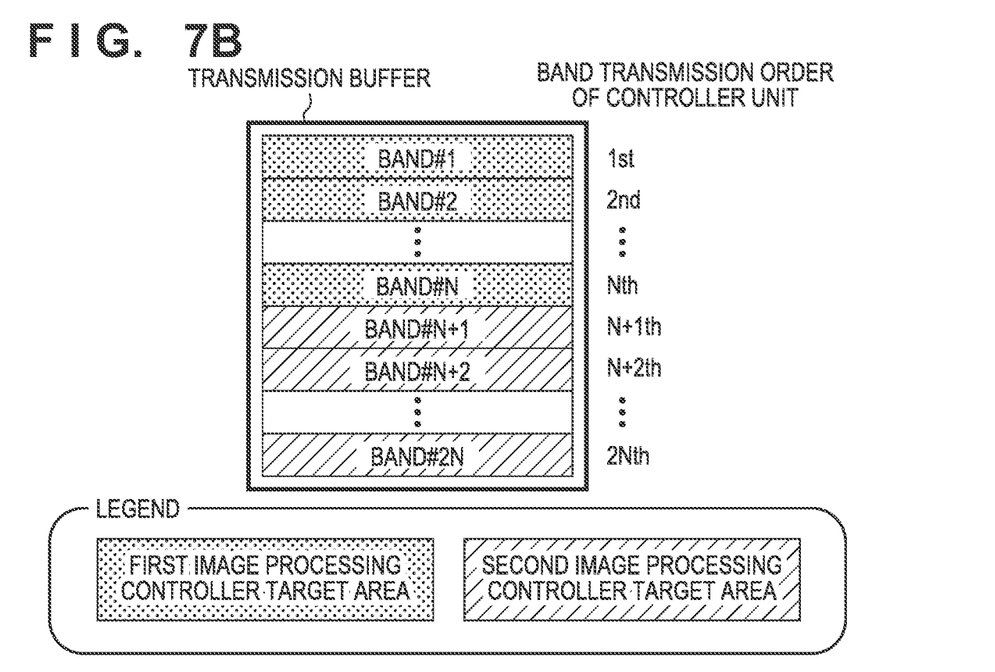

Transmission control processing for controlling two image-data-transmission methods (transfer methods) in the controller unit 100 will be described with reference to FIGS. 7A and 7B. The first transmission method will be described first with reference to FIG. 7A. FIG. 7A illustrates a state in which image data is divided while being stored in a transmission buffer allocated in the RAM 408. More specifically, FIG. 7A illustrates a state in which the image data is divided into data belonging to a processing area (processing target area) under the first image processing controller 410 and data belonging to a processing area (processing target area) under the second image processing controller 417, and each of these areas is further divided by N bands. This embodiment will be described by setting the image data belonging to the target processing area of the first image processing controller 410 as the first half (band #1 to band #N) of the image data, and the image data belonging to the target processing area of the second image processing controller 417 as the second half (band #N+1 to band #2N) of the image data.

In this transfer method, transmission is performed alternately between the processing areas of the respective image processing controllers. That is, at the time of the first transmission, the uppermost band (band #1) in the target processing area of the first image processing controller 410 is transmitted. At the time of the second transmission, the uppermost band (band #N+1) in the target processing area of the second image processing controller 417 is transmitted. At the time of the third transmission, the second band (band #2) from the top in the target processing area of the first image processing controller 410 is transmitted. The entire image data can be transmitted by repetitively performing this processing in which sets of data are alternately transmitted on a band basis until band #2N. This transfer method will be referred to as an alternate transfer hereinafter.

In alternate transfer, since transmission is performed between bands of processing areas under the respective image processing controllers, image processing can be executed in parallel between the respective image processing controllers, and thus it becomes possible to improve the processing speed of the print engine unit 200.

The second transfer method will be described next with reference to FIG. 7B. FIG. 7B also illustrates, in the same manner as FIG. 7A, a state in which the image data is divided by the processing areas and bands. The difference from the alternate transfer method is the transmission sequence of the bands of the controller unit 100. In this transfer method, bands are sequentially transmitted from the uppermost band. That is, band #1 is transmitted at the time of the first transmission, and band #2 is transmitted at the time of the second transmission. The entire image data is transmitted by repeating this transmission process from the uppermost band until band #2N. This transfer method will be referred to as sequential transfer hereinafter.

In sequential transfer, the bands of the target processing area of the first image processing controller 410 are continuously transferred first, and the bands of the target processing area of the second image processing controller 417 are subsequently transferred. Hence, compared to alternate transfer, the effectiveness of the parallel execution of the image processing operations in the respective image processing controllers is degraded, and the processing speed of the print engine unit 200 is also reduced.

However, in a case in which the following conditions are satisfied, the processing of the controller unit 100 can be executed at a higher speed by sequential transfer than by alternate transfer, and the processing speeds of the processing by the controller unit 100 and the processing by each image processing controller can be improved.

<Condition 1> A transmission buffer of a size corresponding to image data of one page cannot be allocated.

<Condition 2> A decoder cannot perform partial decoding.

Partial decoding will be described here. Partial decoding is a function that decodes only an arbitrary band of the image data.

In the case of a decoder that can execute partial decoding, if an arbitrary band is to be decoded, only the time for decoding this band will be required. In the case of a decoder that can execute partial decoding, the processing time required to decode any band will be the time required to decode one band.

On the other hand, in the case of a decoder that cannot execute partial decoding, decoding needs to be performed from the uppermost band of the image data bands even if an arbitrary band is to be decoded. Since the decoding processing itself will also be performed on bands other than the arbitrary band, discarding/deleting of unnecessary data will be required. In the case of the decoder that cannot execute partial decoding, a time required to decode an nth band will be the time required to decode n bands.

The sequence of the processing performed in the controller unit 100 in a case in which each transfer method is used when the two conditions described above are satisfied will be described with reference to FIGS. 8 and 9. The sequence of the decoding processing performed in the case of alternate transfer will be described first with reference to FIG. 8. A description will be given by using a case in which the transmission buffer corresponds to only one band.

The first band to be transmitted is band #1. Since band #1 is the uppermost band of the image data, the decoder control unit 406 executes decoding processing on one band to rasterize the band data in the transmission buffer. Next, the inter-ASIC I/F control unit 405 transmits the rasterized band data. The capacity of the decoding area required for this band transmission is one band.

The second band to be transmitted is band #N+1. Since band #N+1 is a band apart by N bands from band #1 that has been transmitted first, the decoder control unit 406 restarts the decoding from band #2, executes decoding processing on N bands to rasterize the decoding band data in the transmission buffer. Next, the inter-ASIC I/F control unit 405 transmits the rasterized band data. The capacity of the decoding area required for this band transmission is N bands.

The third band to be transmitted is band #2. Since band #2 is a band positioned on an upper side than the band #N+1 that has been transmitted second, the decoder control unit 406 causes the decoder to perform the processing again from the beginning, execute decoding processing on two bands to rasterize the band data in the transmission buffer. Next, the inter-ASIC I/F control unit 405 transmits the rasterized band data. The capacity of the decoding area required for this band transmission is two bands.

Figure 8:
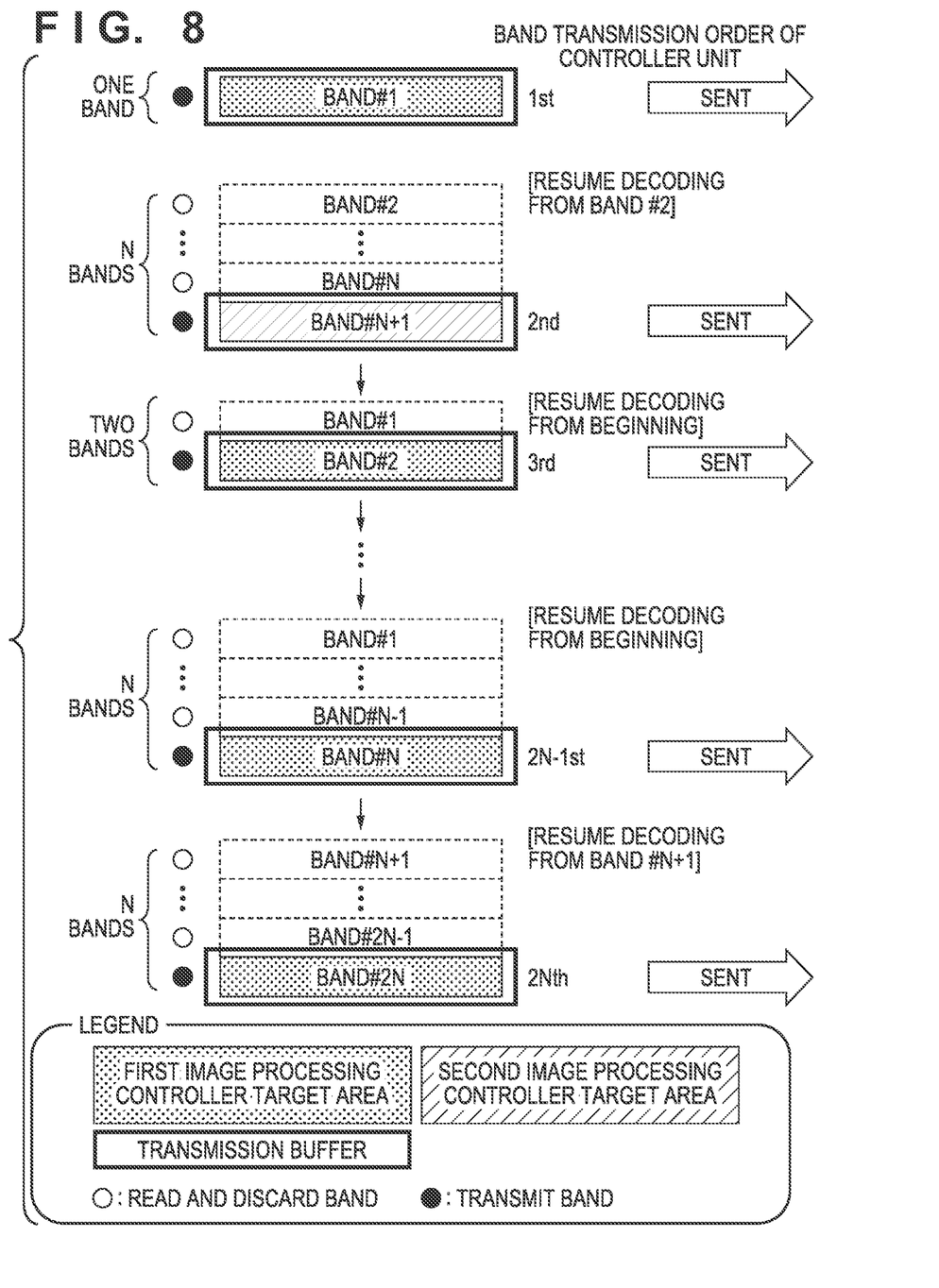
FIG. 8 is a view for explaining alternate transfer.

Although the illustration has been omitted in FIG. 8, the fourth band to be transmitted is band #N+2, and the capacity of the decoding area required for this band transmission is N bands in the same manner as the second band transmission.

When this kind of processing is repeatedly performed until band #2N, decoding needs to be executed for N×N+ (1+2+ . . . +N) bands. The required decoding area will increase in a quadratic functional manner in accordance with the increase in the number of bands, and the processing time will increase in proportion to the decoding area as a result.

Although parallel processing of the image processing controllers is possible in alternate transfer, the processing speed of the controller unit 100 will be reduced greatly depending on the processing time of the decoder, the number of bands, and the size of the transmission buffer if alternate transfer is performed. In particular, the processing speed of the controller unit 100 will be reduced greatly when the image data size is large. As a result, the processing speeds of the processing by the controller unit 100 and the processing of each image processing controller will also be reduced.

The sequence of decoding processing performed in the case of sequential transfer will be described next with reference to FIG. 9. A description will be given by using a case in which the transmission buffer corresponds to only one band in the same manner as FIG. 8.

The first band to be transmitted is band #1. Since band #1 is the uppermost band of the image data, the decoder control unit 406 executes decoding processing on one band to rasterize the band data in the transmission buffer. Next, the inter-ASIC OF control unit 405 transmits the rasterized band data. The capacity of the decoding area required for this band transmission is one band.

The second band to be transmitted is band #2. Since band #2 is a band apart by one band from band #1 that has been transmitted first, the decoder control unit 406 restarts the decoding processing from band #2, executes decoding processing on one band to rasterize the band data in the transmission buffer. Next, the inter-ASIC OF control unit 405 transmits the rasterized band data. The capacity of the decoding area required for this band transmission is one band.

Figure 9:
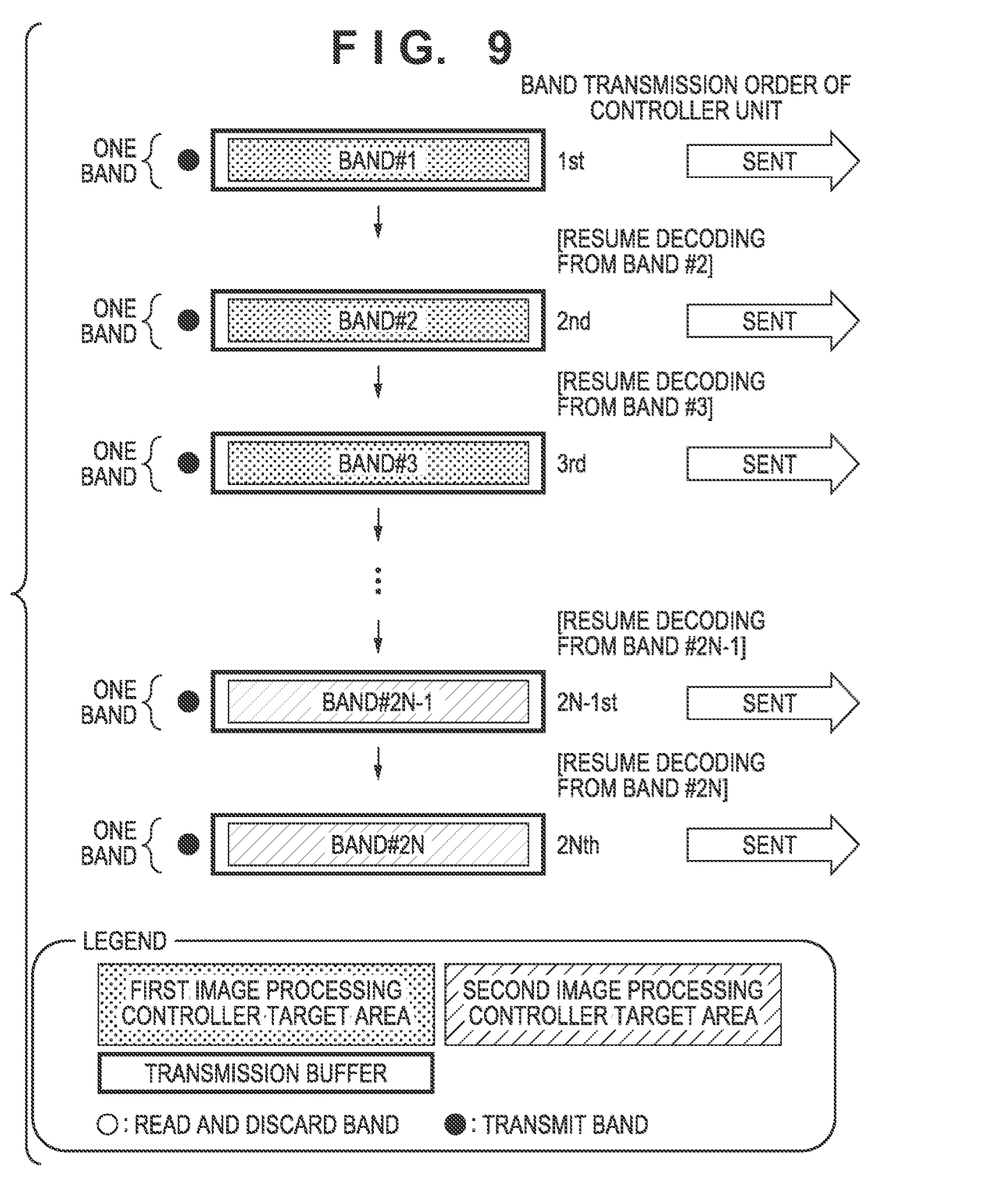
FIG. 9 is a view for explaining sequential transfer.

Although the illustration has been omitted in FIG. 9, the third band to be transmitted is band #3, and the capacity of the band area required for band transmission corresponds to one band when transmission is performed in the same manner as the second band transmission.

Since decoding processing is required for only 2N bands even if such processing is repeated until band #2N, the decoding processing time can be suppressed compared to that in the above-described alternate transfer, and the decoding processing time will be equal to that when the transmission buffer can be allocated for image data of one page.

In this case, since parallel processing of the image processing controllers cannot be performed in sequential transfer, the processing time of the print engine unit 200 will increase accordingly compared to that in the case of alternate transfer. However, since the controller unit 100 need not perform decoding, discarding, or deleting on a band other than each decoding target band, speed of the decoding processing will be higher than that of the decoding processing performed in alternate transfer. Hence, it is possible to prevent a state in which the processing speeds of the controller unit 100 and the image processing controllers overall are reduced due to the slowness of the processing of the controller unit 100 as in the case of the alternate transfer method.

That is, depending on the two conditions described above related to the number of bands (the size of the image data) and the size of the transmission buffer, there may be cases in which the overall processing speeds of the controller unit 100 and the image processing controllers will be increased by employing alternate transfer or will be increased by employing sequential transfer. This embodiment switches between alternate transfer and sequential transfer in accordance with the conditions. As a result, the transfer method with the higher processing speed is constantly selected, and the throughput of the overall printing apparatus 1 can be improved.

Figure 6:
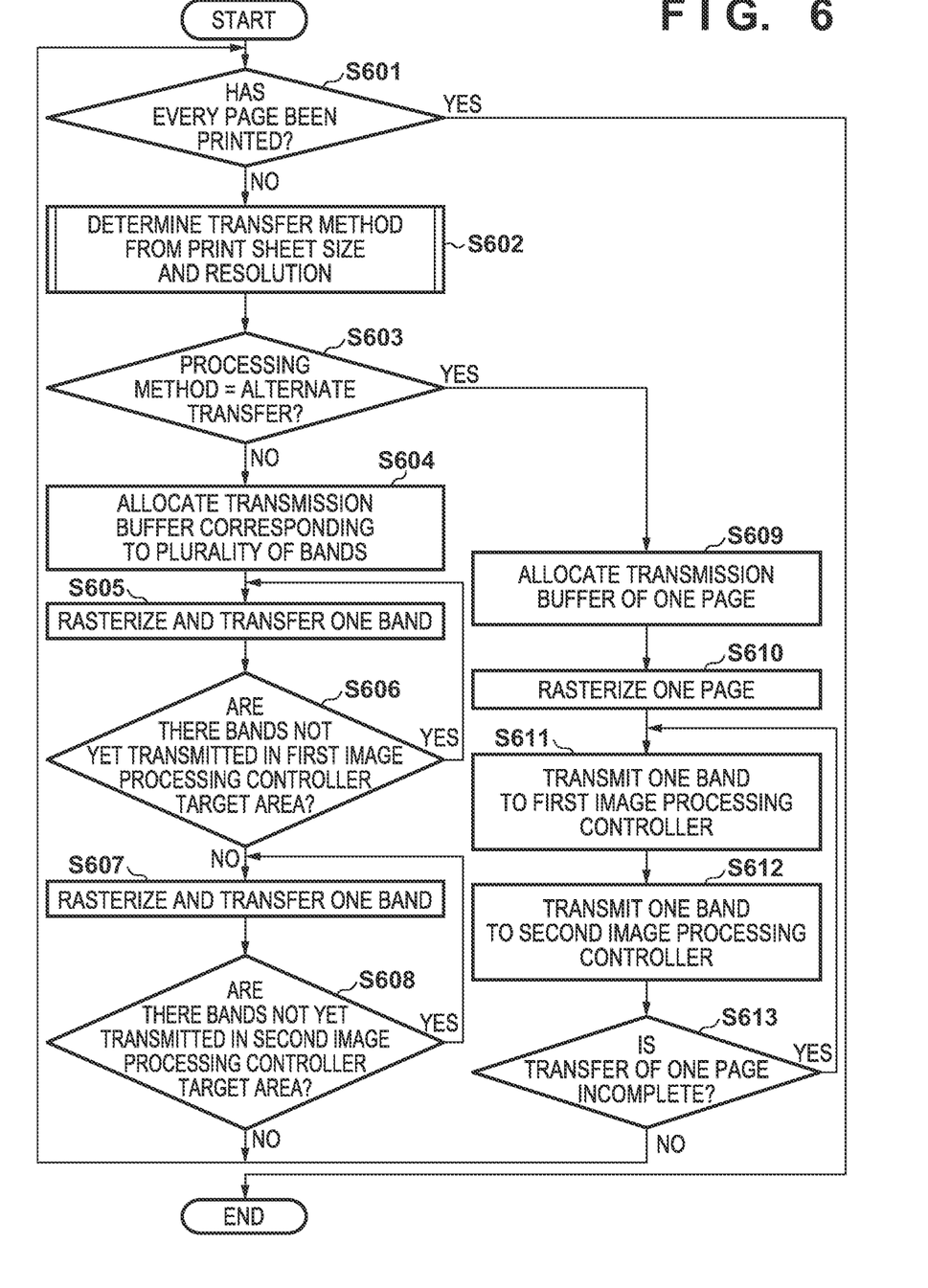
FIG. 6 is a flowchart showing image data transfer control processing.

FIG. 6 is a flowchart showing image data transfer processing executed by the controller unit.

In step S601, the CPU 401 determines whether all of the pages of the print job in the print instruction have been printed. If all of the pages have not been printed (NO in step S601), the CPU 401 determines, in step S602, a transfer method based on the print sheet size and the print resolution included in the print settings obtained in step S502. Although the processing of step S602 will be described in detail later, the transfer method is switched between alternate transfer and sequential transfer based on the print settings including the print sheet size and the print resolution. This kind of processing can prevent a state in which the throughput of the printing apparatus 1 is degraded due to an increase in the decoding area and the processing when alternate transfer on a band basis is simply executed as described in FIG. 8. If it is determined that all of the pages have been printed (YES in step S601), the processing of FIG. 6 ends.

In step S603, the CPU 401 determines whether the transfer method is alternate transfer. In this embodiment, a state not employing alternate transfer represents, namely, a state employing sequential transfer. If it is determined that the transfer method is not alternate transfer (NO in step S603), the CPU 401 allocates, in step S604, a transmission buffer corresponding to a plurality of bands (2N bands) in the RAM 408.

In step S605, the decoder control unit 406 instructs the decoder to rasterize image data of one band from the compressed data in the transmission buffer. In addition, the inter-ASIC I/F control unit 405 transfers the band data in the transmission buffer to the first image processing controller 410. In step S605, rasterization and transferring of band data belonging to the target processing area of the first image processing controller 410 are performed.

In step S606, the CPU 401 determines whether there is a band that has not been transmitted in the target processing area of the first image processing controller 410. If it is determined that there is a band that has not been transmitted (YES in step S606), the process returns to step S605. Otherwise (NO in step S606), the decoder control unit 406 will instruct, in step S607, the decoder to rasterize image data of one band from the compressed data in the transmission buffer. In addition, the inter-ASIC I/F control unit 405 will transfer the band data in the transmission buffer to the first image processing controller 410.

In step S607, the second image processing controller 417 executes rasterization of each band belonging to the target processing area of the second image processing controller 417. In step S608, the CPU 401 determines whether there is a band that has not been transmitted in the target processing area of the second image processing controller 417. If it is determined that there is a band that has not been transmitted (YES in step S608), the process returns to step S606. Otherwise (NO in step S608), the process returns to step S601, and the process moves to the transfer processing for the next page. The processes of steps S604 to S608 correspond to the processes described in FIG. 7B and FIG. 9.

In step S609, if the CPU 401 determines that the transfer method is alternate transfer (YES in step S603), the CPU 401 allocates a transmission buffer of one page in the RAM 408.

In step S610, the decoder control unit 406 instructs the decoder to rasterize image data of one page from the compressed data in the transmission buffer. In step S611, the inter-ASIC OF control unit 405 transfers one set of band data belonging to the target processing area of the first image processing controller 410 to the first image processing controller 410. In step S612, the inter-ASIC OF control unit 405 transfers one set of band data belonging to the target processing area of the second image processing controller 417 to the second image processing controller 417.

In step S613, the CPU 401 determines whether there is a band that has not been transmitted among the bands of one page. If it is determined that there is a band that has not been transmitted (YES in step S613), the process returns to step S611. Otherwise (NO in step S613), the process returns to step S601, and the process moves to the transfer processing for the next page. The processes of steps S610 to S613 correspond to processes described in FIG. 7A and FIG. 8.

In this manner, the degradation of the throughput of the printing apparatus 1 can be prevented by switching the transfer method based on the print settings.

Figure 10:
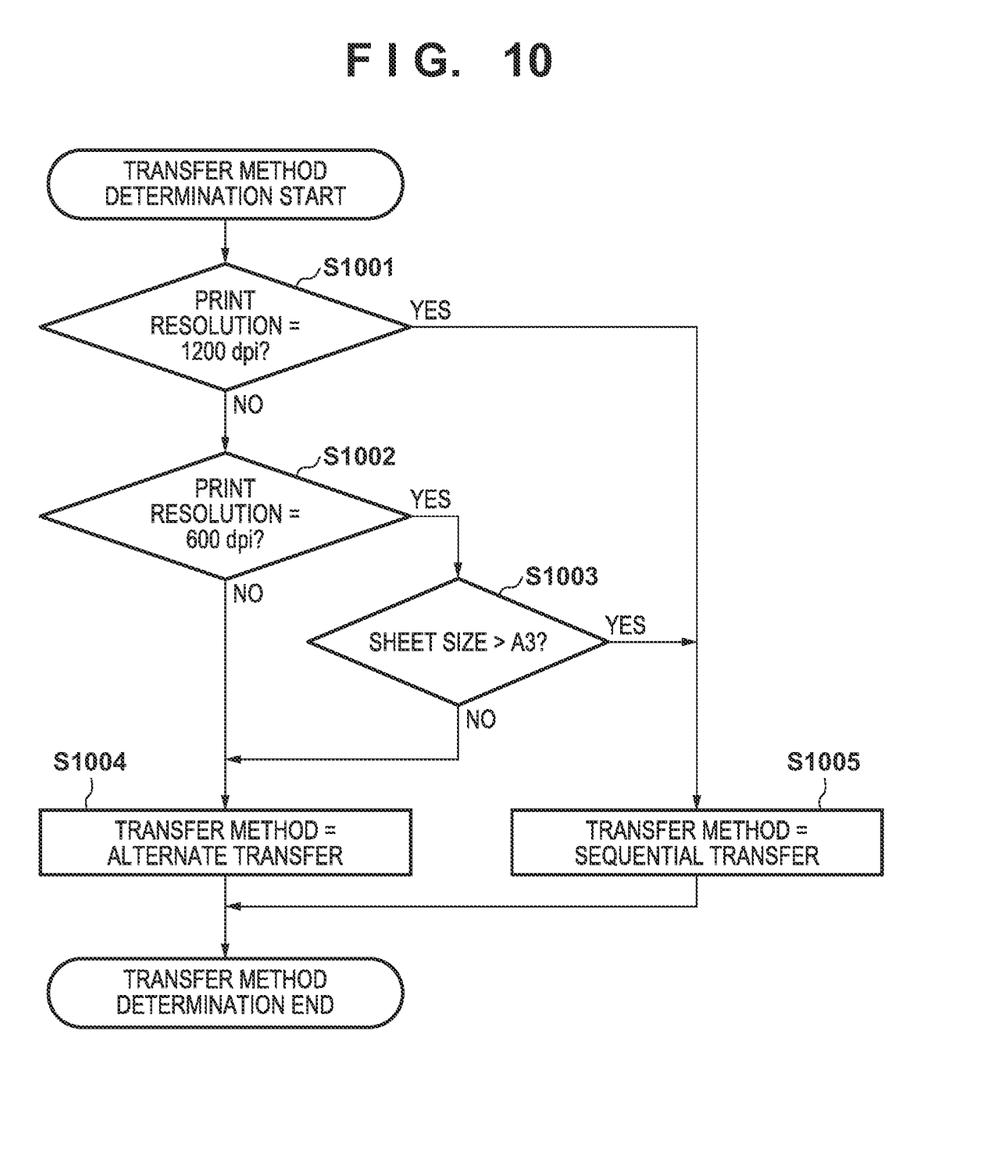
FIG. 10 is a flowchart showing transfer method determination processing.

Transfer method determination processing performed in step S602 of FIG. 6 will be described with reference to FIG. 10. FIG. 10 is flowchart showing the transfer method determination processing. An example in which 1200 dpi, 600 dpi, and 300 dpi can be set as the print resolutions in the printing apparatus 1, and the maximum size of image data that can be fully rasterized as a page in the transmission buffer corresponds to the print settings of an A3 sheet size at 600 dpi will be described. In addition, the decoder controlled by the decoder control unit 406 is decoder that cannot execute partial decoding.

As described above, whether the overall processing speeds of the controller unit 100 and the image processing controllers will be increased by employing sequential transfer or by employing alternate transfer depends on the size of the image data. Also, the higher the print resolution is and the larger the print sheet size is, the larger the size of the image data. Hence, in FIG. 10, both the print resolution and the sheet size are used to select whether to employ sequential transfer or alternate transfer as the transfer method.

In step S1001, the CPU 401 determines whether the print resolution is 1200 dpi. If it is determined that the print resolution is 1200 dpi (YES in step S1001), the CPU 401 determines, in step S1005, sequential transfer as the transfer method and ends the processing of FIG. 10. On the other hand, if it is determined that the print resolution is not 1200 dpi (NO in step S1001), the CPU 401 determines, in step S1002, whether the print resolution is 600 dpi.

If it is determined that the print resolution is 600 dpi (NO in step S1002), the CPU 401 determines, in step S1003, whether the print sheet size is larger than A3. If it is determined that the print sheet size is larger than A3 (YES in step S1003), the CPU 401 determines, in step S1005, to employ sequential transfer as the transfer method and ends the processing of FIG. 10. If it is determined that the print sheet size is equal to or less than A3 (NO in step S1003), the CPU 401 determines, in step S1004, to employ alternate transfer as the transfer method and ends the processing of FIG. 10. Note that although the determination is performed based on the sheet size in step S1003, it may be set so that the determination will be made based on whether the buffer memory size is equal to or more than a threshold. In such a case, the data size can be obtained from the sheet size and the print resolution set in the print settings, and the obtained value can be compared to the threshold.

In step S1002, if it is determined that the print resolution is not 600 dpi (NO in step S1002), the CPU 401 will determine to employ alternate transfer as the transfer method and ends the processing of FIG. 10.

As shown in FIG. 10, the transfer method can be selected by making a determination based on the combination of the print resolution and the sheet size as the print settings.

Note that although the A3 sheet size at 600 dpi was used as the branch point for selecting alternate transfer and sequential transfer in FIG. 10, the present invention is not limited to this. For example, the branch point may be set to various kinds of points in accordance with the transmission buffer memory capacity of the RAM 408. For example, if the RAM 408 has a small capacity, it may be set so that alternate transfer will be employed only when 300 dpi is set, or if the RAM 408 has a sufficiently large capacity, it may be set so that A3 size at 1200 dpi will be used as the branch point.

Furthermore, alternate transfer is not limited to a case in which transfer is alternately performed band by band from the area of band #1 to band #N and the area of band #N+1 to band #2N shown in FIG. 7A. For example, it may be applied to a case in which a plurality of bands are alternately transferred from the two areas described above.

The above-described embodiment described an example in which image data corresponding to one page is divided between the respective processing areas of two image processing controllers, and each divided set of image data is transmitted to a corresponding one of the image processing controllers. However, the present invention is not limited to two image processing controllers, and the same arrangement can also be employed in a case in which there are more than two, that is, a plurality of (N) image processing controllers. For example, it may have an arrangement in which image data corresponding to one page is divided among the respective processing areas of three image processing controllers and each set of divided image data is transmitted to the corresponding one of the image processing controllers. For example, band #1 to band #3 can be the target processing area of an image processing controller A, band #4 to band #6 can be the target processing area of an image processing controller B, and band #7 to band #9 can be the target processing area of an image processing controller C.

"Alternate transfer" has been described for a case in which two image processing controllers are to be used. However, in a case in which three image processing controllers are to be used, image data belonging to a band of each target processing area will be cyclically transmitted on a band basis in the order of the image processing controller A, the image processing controller B, the image processing controller C, A, B, C . . . . In this case, if the decoder controlled by the decoder control unit 406 cannot execute partial decoding, the following operation will be performed.

(1) The controller unit 100 decodes and transmits band #1 to the image processing controller A. The controller unit 100 decodes the band #2 to band #4 and transmits band #4 to the image processing controller B. The controller unit 100 decodes the band #5 to band #7 and transmits band #7 to the image processing controller C.

(2) The controller unit 100 decodes band #1 and band #2 and transmits band #2 to the image processing controller A. The controller unit 100 decodes the band #3 to band #5 and transmits band #5 to the image processing controller B. The controller unit 100 decodes the band #6 to band #8 and transmits band #8 to the image processing controller C.

(3) The controller unit 100 decodes band #1, band #2, and band #3 and transmits band #3 to the image processing controller A. The controller unit 100 decodes the band #4 to band #6 and transmits band #6 to the image processing controller B. The controller unit 100 decodes the band #7 to band #9 and transmits band #9 to the image processing controller C.

As a result, processing of 3×6+(1+2+3)=24 bands is obtained. On the other hand, in a case in which the "sequential transfer" method is employed, the following operation will be performed.

(1) The controller unit 100 decodes and transmits band #1 to the image processing controller A.

(2) The controller unit 100 decodes and transmits band #2 to the image processing controller A.

Subsequently, the decoding and transmission of one band are repeated until "(9) The controller unit 100 decodes and transmits band #9 to the image processing controller C", thereby resulting in processing of nine bands.

That is, in the same manner as in a case in which two image processing controllers are used, the band processing load of a cyclical transfer operation can be reduced by employing "sequential transfer".

As described above, according to this embodiment, image data can be transmitted to a plurality of image processing controllers by using an appropriate transmission method. As a result, substantial degradation of the throughput of the printing apparatus can be avoided even in a case in which image data of an entire page cannot be stored in the transmission buffer due to the sheet size and the print resolution.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-045929, filed Mar. 13, 2018, which is hereby incorporated by reference herein in its entirety.

What is claimed is:

1. A printing apparatus comprising:
a controller configured to obtain encoded image data; and
a first image processing unit and a second image processing unit each of which is configured to generate print data to be used by a printing unit based on the encoded image data obtained by the controller, wherein a processing target area of the first image processing unit and a processing target area of the second image processing unit are different from each other in the encoded image data,
wherein the controller comprises
a decoder configured to decode first band data and second band data included in the encoded image data, wherein the first band data corresponds to a part of the processing target area of the first image processing unit and the second band data corresponds to a part of the processing target area of the second image processing unit;
a transmission unit configured to transmit first band data decoded by the decoder to the first image processing unit, and to transmit second band data decoded by the decoder to the second image processing unit, and
a transmission control unit configured (i) to, in a case where a sheet size of a print setting is a first sheet size, control the transmission unit to transmit the decoded second band data corresponding to at least one band included in the processing target area of the second image processing unit, during a period extending from a start of transmission of the decoded first band data corresponding to the processing target area of the first image processing unit to an end of the transmission of the decoded first band data corresponding to the processing target area of the first image processing unit, and
(ii) to, in a case where the sheet size of the print setting is a second sheet size larger than the first sheet size, control the transmission unit to transmit all decoded first band data, then control the transmission unit to transmit all decoded second band data.

2. The apparatus according to claim 1, wherein
the decoder is a decoder that cannot execute partial decoding, wherein the partial decoding is a function that decodes only an arbitrary band of image data.

3. The apparatus according to claim 1, further comprising a printing unit configured to perform printing on a print medium based on the print data generated by the first image processing unit and the print data generated by the second image processing unit.

4. A control method executed in a printing apparatus that includes a controller configured to obtain encoded imaged data, and
a first image processing unit and a second image processing unit each of which is configured to generate print data to be used by a printing unit based on the encoded image data obtained by the controller, wherein a processing target area of the first image processing unit and a processing target area of the second image processing unit are different from each other in the encoded image data,
wherein the controller
decodes first band data and second band data included in the encoded image data, wherein the first band data corresponds to a part of the processing target area of the first image processing unit and the second band data corresponds to a part of the processing target area of the second image processing unit,
transmits first band data decoded in the decoding to the first image processing unit, and transmits second band data decoded in the decoding to the second image processing unit, and
(i) in a case where a sheet size of a print setting is a first sheet size, performs control to transmit the decoded second band data corresponding to at least one band included in the processing target area of the second image processing unit, during a period extending from a start of transmission of the decoded first band data corresponding to the processing target area of the first image processing unit to an end of the transmission of the decoded first band data corresponding to the processing target area of the first image processing unit, and
(ii) in a case where the sheet size of the print setting is a second sheet size larger than the first sheet size, performs control to transmit all decoded first band data, then to transmit all decoded second band data.

5. The method according to claim 4, wherein
the decoder is a decoder that cannot execute partial decoding, wherein the partial decoding is a function that decodes only an arbitrary band of image data.

6. The method according to claim 4, further comprising:
printing on a print medium based on the print data generated by the first image processing unit and the print data generated by the second image processing unit.

7. The apparatus according to claim 1, wherein, in a case where the sheet size of the print setting is the first sheet size, the controller controls the decoder to alternately decode the first band data and the second band data and the transmission control unit controls the transmission unit to alternately transmit the decoded first band data and the decoded second band data.

8. The apparatus according to claim 1, wherein the first sheet size of the print setting is equal to or smaller than a predetermined sheet size, and the second sheet size of the print setting is larger than the predetermined sheet size.

9. The apparatus according to claim 8, wherein the predetermined sheet size is determined based on a size of a buffer memory of the controller.

10. The apparatus according to claim 1, wherein, in a case where the sheet size of the print setting is the first sheet size and print resolution of the print setting is smaller than a threshold, the transmission control unit controls the transmission unit to transmit the decoded second band data corresponding to at least one band included in the processing target area of the second image processing unit, after the transmission of the decoded first band data corresponding to the processing target area of the first image processing unit starts and before the transmission of the decoded first band data corresponding to the processing target area of the first image processing unit ends, and wherein, in a case where at least one of the sheet size of the print setting is the second sheet size or the print resolution is equal to or larger than the threshold, the transmission control unit controls the transmission unit to transmit all decoded first band data, then controls the transmission unit to transmit the all decoded second band data.

11. The apparatus according to claim 10, wherein the threshold is determined based on a size of a buffer memory of the controller.

12. The apparatus according to claim 1, wherein the controller generates the encoded image data based on the print setting of the print job.

\* \* \* \* \*